Oct. 2, 1923.
J. W. HOODWIN
TRAY
Filed July 9, 1921
1,469,596
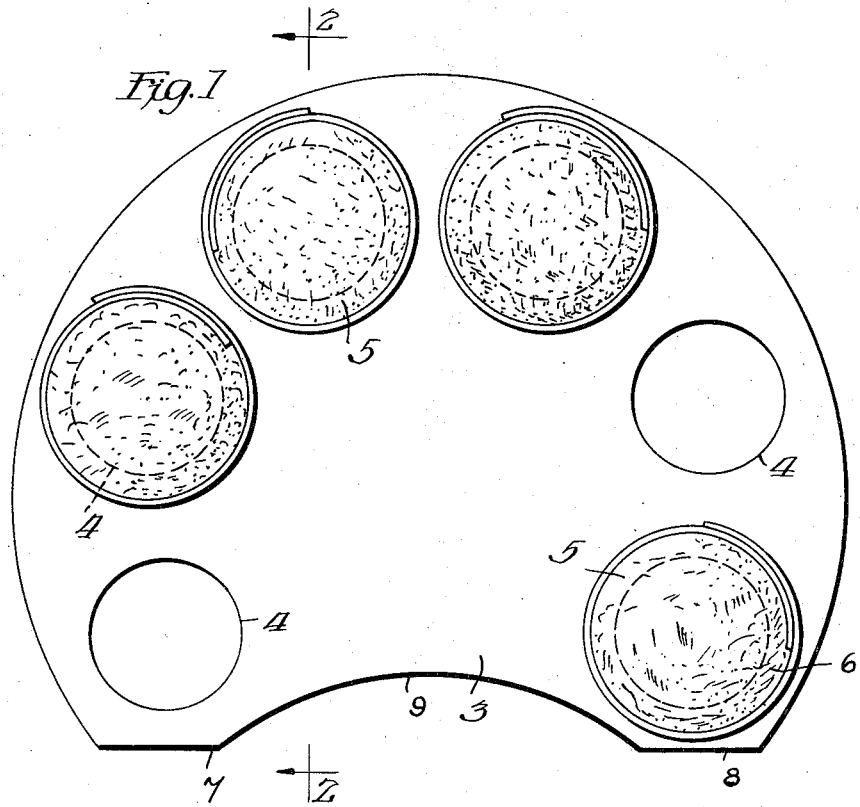
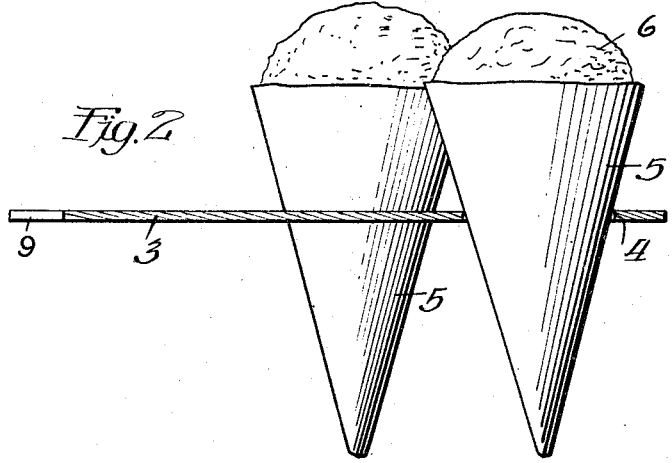
Inventor:
Joseph W. Hoodwin,
By ...., atty.

Patented Oct. 2, 1923.

1,469,596

UNITED STATES PATENT OFFICE.

JOSEPH W. HOODWIN, OF CHICAGO, ILLINOIS, ASSIGNOR TO J. W. HOODWIN COMPANY, OF CHICAGO, ILLINOIS.

TRAY.

Application filed July 9, 1921. Serial No. 483,485.

*To all whom it may concern:*

Be it known that I, JOSEPH W. HOODWIN, a citizen of the United States, and a resident of Chicago, in the county of Cook, State of Illinois, have invented certain new and useful Improvements in Trays, of which the following is a specification.

My invention relates to an improved holder which is particularly adaptable for serving orders of ice cream cones. The handling of a number of cones for filling and serving is a very awkward and unsanitary procedure. The general object of my invention is, therefore, to provide a holder for supporting cones so that they may be readily filled and served with the least amount of handling. More in detail, the object is to provide a convenient and sanitary holder which is particularly adaptable for serving carry orders of ice cream cones and which can be so inexpensively manufactured that it can be given away with an order of cones as advertisement. Another object is to construct the holder of material which is absorbent so that it will absorb drippings and prevent running. The tray can be made of any desired shape and to hold any desired number of cones.

On the accompanying drawing I show one form of holder which I have found very efficient. On the drawing Fig. 1 is a plan view showing a number of filled cones supported on the holder, and Fig. 2 is a sectional view on plane 2—2, Fig. 1.

The holder is in the form of a plate 3 having the circular openings 4 therein for receiving the cones 5, these openings being sufficiently large to engage with the cones close enough to the upper edge thereof to prevent tipping when the balls 6 of ice cream are therein. The plate shown is completely circular except for a section which has been omitted to leave the straight edges 7 and 8 and the concave edge 9 between the straight edges. The holes 4 are arranged in a circular row adjacent the circular edge of the plate to leave ample space between for holding the tray. By placing the fingers of the hand below the central section of the tray and the thumb above this section at the concave edge 9, the tray can be securely and conveniently held and carried. When an order is received the corresponding number of empty cones are placed in the tray openings and the cream balls are then dropped therein, and the entire order is carried away for delivery.

The holder can be constructed for example of wood or metal covered with paper or any other desired absorbent material, but preferably, it is made of inexpensive material such as pulp board or straw board which gives sufficient strength and which is absorbent so as to catch and absorb drippings and prevent flowing of melted cream from the tray or the cones. The tray is therefore very desirable for serving orders of ice cream cones to parties outside in automobiles, or where one person buys an order of cones to be taken away with him for distribution. The tray being so inexpensive can then be given with the order, and advertising matter can be printed thereon. After it has served its purpose as a tray it can be used as a fan. The sanitary features of the holder is particularly important and desirable as it eliminates the promiscuous contact of unclean hands with the cones during filling and serving thereof. The holder can be made of any desired shape and for holding any number of cones.

Having described my invention, I claim as follows:

1. As an article of manufacture a holder for cones formed of a flat rigid absorbent sheet of material, one side of said holder having straight edges with a concave cutaway portion therebetween, forming a hand hold, the sheet of material being cut away to form openings around the edges of the holder, the drippings from the cones being absorbed by the material of the holder.

2. As an article of manufacture, a holder for cones formed of a flat rigid absorbent sheet of material, one aspect thereof being suitably shaped to form a hand grip, and perforations provided in said sheet of absorbent material serving for the reception of the cones, the drippings from the cones being absorbed by the material of the holder.

In witness whereof, I hereunto subscribe my name this 5th day of July A. D., 1921.

JOSEPH W. HOODWIN.